United States Patent [19]

Turunc

[11] Patent Number: 5,089,142
[45] Date of Patent: Feb. 18, 1992

[54] METHODS FOR DEWATERING COAL AND MINERAL CONCENTRATES

[75] Inventor: Umit Turunc, Doylestown, Pa.

[73] Assignee: Betz Laboratories, Inc., Trevose, Pa.

[21] Appl. No.: 605,622

[22] Filed: Oct. 30, 1990

[51] Int. Cl.$^5$ ............................................. C02F 1/38
[52] U.S. Cl. .................................. 210/728; 209/5; 210/729; 210/778; 210/787
[58] Field of Search .................. 209/5; 210/725, 727, 210/728, 729, 732, 778, 781, 787

[56] References Cited

U.S. PATENT DOCUMENTS

| 4,146,473 | 3/1979 | Edelmann et al. | 210/52 |
| 4,207,186 | 6/1980 | Wang et al. | 210/54 |
| 4,290,897 | 9/1981 | Swihart | 210/710 |
| 4,447,344 | 5/1984 | Roe | 210/727 |
| 4,555,329 | 11/1985 | Sykes et al. | 209/5 |
| 4,618,414 | 10/1986 | Hartan et al. | 209/5 |
| 4,778,598 | 10/1988 | Hoffman et al. | 209/5 |
| 4,853,133 | 8/1989 | Flynn et al. | 210/729 |
| 4,892,663 | 1/1990 | Keys | 210/729 |
| 4,985,162 | 1/1991 | Cole | 252/60 |

FOREIGN PATENT DOCUMENTS

| 1108317 | 9/1981 | Canada. | |
| WO85/03065 | 7/1985 | PCT Int'l Appl. | 252/60 |

Primary Examiner—Peter Hruskoci
Attorney, Agent, or Firm—Alexander D. Ricci; Steven D. Boyd

[57] ABSTRACT

A method and composition for dewatering coal and mineral slurries by centrifugation or filtration wherein a dewatering aid in combination with a clay dispersant is added to the slurry prior to centrifugation. The dewatering aid is preferably an alkylphenolethoxylate surfactant and the clay dispersant is preferably sodium hexametaphosphate. The combination aids in dewatering and also reduces the ash content of coal treated with the combination.

6 Claims, No Drawings

METHODS FOR DEWATERING COAL AND MINERAL CONCENTRATES

FIELD OF THE INVENTION

The present invention relates to the dewatering of coal and mineral concentrates. More particularly, the present invention relates to the dewatering of coal and mineral concentrates in a centrifugal dryer in which a dewatering aid is employed wherein the permeability of the bed in the dryer is maintained in the presence of slimes by the addition of a clay dispersant.

BACKGROUND OF THE INVENTION

In the mining, cleaning and transporting of coal and other minerals, considerable quantities of water and fine coal and minerals are processed. For example, long wall coal mining, which uses large quantities of water, produces wet coal which is finer and dirtier than coal and minerals produced by other processes. Additionally, coal or mineral cleaning frequently includes water washing, crushing and froth flotation which results in a coal/water mixture commonly referred to as a slurry. Such slurries are usually subjected to dewatering so that they may be shipped more economically, further processed more readily, or in the case of coal provide higher heat output per ton. In dewatering, the coal or mineral concentrate is slurry form is subjected to sedimentation, decantation, filtration, centrifugation etc., to facilitate the removal of water therefrom. A single mineral processing plant may employ a variety of individual dewatering unit operations. The output of these individual unit operations is typically blended to provide mineral i.e. coal of a desired specification of moisture and ash content.

The dewatering of a fine coal slurry is typically done by centrifuging. Centrifuging an aqueous coal slurry can produce fine coal having a water content of approximately 15 to 20% by weight. The use of certain surfactants as dewatering aids can improve the dewatering of fine coal being centrifuged. For example, small amounts of dioctylsulfosuccinate mixed with a fine coal slurry can produce a dryer product than obtained without application of the surfactant. However, the use of surfactants is not completely satisfactory. The surfactant can cause foaming of the slurry. Additionally, over time the surfactant can build up in the water which is recycled for reuse causing foaming problems.

In U.S. Pat. No. 4,290,897 a process for dewatering fine coal is described in which a water soluble organopolysiloxane plus a water emulsifiable organopolysiloxane is employed as a dewatering aid. In U.S. Pat. No. 4,853,133 a process for dewatering coal is described in which an ionic surfactant is employed as a dewatering aid in coal which is to be centrifuged and a foam suppressing amount of a cationic organic compound is added to the effluent. The cationic compound controls foaming by reacting with the ionic surfactant to form a solid precipitate which must be removed from the recycled water.

In the dewatering of fine coal or minerals by centrifuge or filtration, the formation of slimes by clay or shale material finer than $-100$ mesh and often $-325$ mesh can significantly decrease the permeability of the bed in the centrifuge or on the filter. U.S. Pat. No. 4,207,186 notes that in the removal of water from mineral concentrates by filtration the filter cake can often become substantially impermeable and significantly reduce filtration speeds. The patent teaches a dewatering aid combination that lowers the residual water content of the filter cake which comprises a hydrophobic alcohol and a nonionic surfactant.

Flocculants such as linear, long chain water soluble anionic or nonionic polymers based on polyacrylamide have been employed as filter aids. Flocculants bridge individual fine particles giving multi-particle aggregates which have a greater permeability and allow water to flow through the cake more readily.

In addition to the effects additives have upon the dewatering operation, the effects such additives have on water recycling are of great concern. The large volumes of water employed in such operations are recycled for economic and environmental reasons. The effluent water from a dewatering operation is typically clarified as in a settling pond where flocculants are routinely employed to remove clay. Any treatments added upstream, that is prior to dewatering, are necessarily selected so as not to adversely effect the clarification operations. For this reason, many potential upstream additives such as dispersants are generally avoided due to the belief that they would adversely effect the action of flocculants in the downstream clarifiers.

SUMMARY OF THE INVENTION

The present invention is directed to methods for dewatering coal and mineral concentrates. The methods of the present invention comprise applying to a solid coal/mineral particulate aqueous slurry a dewatering aid and also applying a clay dispersant in combination with the dewatering aid. The methods of the present invention are particularly effective at restoring bed permeability in centrifugal dryers when treating clean coal or mineral concentrates which contain a large proportion of slimes i.e. clay or shale material finer than $-100$ mesh and more commonly $-325$ mesh. It was found that the use of a clay dispersant in conjunction with a dewatering aid restores bed permeability in centrifugal dryers and in particular modified centrifugal dryers and allows water to drain from coal having a large proportion of slimes. Modified centrifugal dryers are employed to dry coal having a particle size less than about 10 mesh. It is believed the methods of the present invention would also be effective when filtration type dryers are employed for dewatering of mineral slurries. The dewatering aid and clay dispersant of the present invention may be added individually or as a combination.

The methods of the present invention were found to have no adverse effects on downstream water clarification operations wherein clays are flocculated and settled out even though a clay dispersant is added upstream. The dewatering aids of the present invention are preferably nonionic surfactants such as alkylphenolethoxylate surfactants and the preferred clay dispersant is sodium hexametaphosphate. In addition, it was discovered that coal dewatered in accordance with the methods of the present invention exhibited reduced ash numbers.

DESCRIPTION OF PREFERRED EMBODIMENTS

The present invention is based upon the discovery that a clay dispersant can be used in conjunction with dewatering aids in the dewatering of coal or mineral concentrates which contain a large proportion of slimes. The problem of reduced bed permeability due to the presence of slimes or clay can arise in filtration type dryers as well as centrifugal dryers. The use of clay dispersants in conjunction with dewatering aids was found to restore bed permeability and allow water to drain from coal and achieve moisture levels lower than possible with a dewatering aid alone. In addition, the combination of an alkylphenolethoxylate dewatering surfactant in combination with a sodium hexametaphosphate clay dispersant was found to reduce the ash numbers (measured in accordance with industry standards) of coal treated in accordance with the present invention. The methods of the present invention were found to have no detrimental effects on the treatment of the effluent water for recycling.

Treatment levels of the combination of the present invention will vary with the specific coal or mineral concentrate being dewatered. Typical treatment levels can range from about 0.2 to about 2.5 pounds of treatment per ton of coal or mineral concentrate. It is believed that the combination of the present invention will exhibit a threshold treatment level for a specific material being treated which can be easily determined with laboratory testing.

The preferred dewatering aids of the present invention are nonionic surfactants. Particularly preferred dewatering aids are alkylphenolethoxylate surfactants having from about 1 to about 10 moles of ethyoxylation, such as the Surfonic ® series available commercially from Texaco Co., and the Triton ® series available from Rohm and Haas. In the examples below, a blend of 25% Triton ® X-15 [octylphenolethoxylate, 1.5 moles of ethoxylation] and 75% Surfonic ® N-95 [nonylphenolethoxylate, 9.5 moles of ethoxylation] was employed.

The preferred clay dispersants of the present invention are materials such as sodium hexametaphosphate available commercially from Calgon Corp., under the trade name Calgon ®. It is believed other clay dispersants would be similarly effective.

The present invention will now be further described with reference to a number of specific examples which are to be regarded solely as illustrative and not as restricting the scope of the invention.

EXAMPLE 1

Laboratory tests were performed in order to determine the efficacy of the present invention. Coal samples were treated as set forth in Table 1, and centrifuged in tubes with 50 mesh screen bottoms to allow water to drain. The solids were weighed, dried at 105° C. and weighed again. The percentage moisture of the dewatered coal samples was calculated by difference. Table 1 summarizes the results.

TABLE 1

| Percent of Moisture of Dewatered Coal Samples | | | | |
|---|---|---|---|---|
| Treatment Dosage lbs/ton | Control (No Treatment) | Treatment | | |
| | | A | B | A + B |
| 0.05 | 37.69 | 37.97 | 36.62 | 16.07 |
| 0.10 | 15.51 | 15.00 | 21.24 | 25.18 |
| 0.15 | 37.62 | 16.07 | 37.54 | 36.74 |
| 0.20 | 27.62 | 37.97 | 37.70 | 15.67 |

TABLE 1-continued

| Percent of Moisture of Dewatered Coal Samples | | | | |
|---|---|---|---|---|
| Treatment Dosage lbs/ton | Control (No Treatment) | Treatment | | |
| | | A | B | A + B |
| 0.25 | 16.02 | 38.33 | 33.06 | 14.07 |

A = sodium hexametaphosphate clay dispersant
B = alkylphenolethoxylate surfactant dewatering aid comprising blend of Triton ® X-15 and Surfonic ® N-95 described above.

As can be seen from the percent moisture of coal samples treated with the combination of the present invention at total treatment rates of greater than 0.20 pounds per ton, the combination demonstrated improved efficacy as indicated by the greatly reduced moisture content of the dewatered coal. The results also show a threshold treatment level for this particular coal type.

It is believed that this threshold level is specific and a function of coal type. Accordingly, similar lab testing can be employed to quickly determine the most efficacious treatment rates for a specific coal type.

In addition to the above laboratory testing, a field trial, in a working coal processing plant was undertaken in order to illustrate the effectiveness of the present invention under working conditions and to determine the downstream effects of the methods of the present invention.

Testing was conducted at a commercial coal process plant which employed modified centrifugal dryers as well as other drying unit operations to produce coal meeting a specific moisture and ash specification. Percent moisture and percent ash were measured for the output of the modified driers over several weeks. Control (no treatment) data was gathered as a base line. Data was also gathered for treatment consisting of sodium hexametaphosphate clay dispersant alone, and a blend of sodium hexametaphosphate and an alkylphenolethoxylate surfactant dewatering aid in accordance with the present invention. The alkylphenolethoxylate surfactant is as described above. Table 2 summarizes the results which show that the desired moisture content could be maintained at significantly increased coal throughput. That is up to 30 percent more coal could be dewatered in the equipment to the required moisture content after treatment in accordance with the present invention. The data in Table 2 is averages for several days runs. Additionally, the ash content of the treatment coal was reduced significantly.

TABLE 2

| Commercial Modified Centrifugal Dryer | | | | | |
|---|---|---|---|---|---|
| Treatment Dosage lbs/ton | | Coal Thruput Tons/Hour | | | |
| A | B | Plant | Dryer | % Moisture | % Ash |
| — | — | 516 | 20 | 15.08 | 14.96 |
| .32 | .31 | 554 | 30 | 14.56 | 12.56 |
| .351 | — | 697 | 35 | 17.08 | 20.11 |
| .351 | .296 | 590 | 35 | 15.18 | 14.03 |
| .351 | .296 | 598 | 35 | 14.61 | 11.81 |

While this invention has been described with respect to particular embodiments thereof, it is apparent that numerous other forms and modifications of the invention will be obvious to those skilled in the art. The appended claims and this invention generally should be construed to cover all such obvious forms and modification which are within the true spirit and scope of the present invention.

What is claimed is:

1. A method for dewatering an aqueous slurry of fine mesh coal particulates have a particle size less than about 10 mesh and slimes finer than $-100$ mesh, in a centrifugal dryer wherein a nonionic surfactant dewatering aid is added to said slurry of fine mesh coal prior to the centrifugal dryer, the improvement, for maintaining bed permeability in said dryer in the presence of said slimes comprising adding a sufficient amount for the purpose of a sodium hexametaphosphate to said slurry prior to the centrifugal dryer, to disperse said slimes and maintain said bed permeability 2. The method of claim 1 wherein said nonionic surfactant dewatering aid is an alkylphenolethoxylate surfactant having from about 1 to about 10 moles of ethoxylation.

3. A method for dewatering fine mesh coal having a particle size less than about 10 mesh and slimes finer than $-100$ mesh, in a centrifugal dryer wherein bed permeability in said dryer is maintained in the presence of said slimes comprising applying to said fine mesh coal from about 0.2 to about 2.5 pounds of a combination of a nonionic surfactant dewatering aid and sodium hexametaphosphate per ton of coal, prior to the centrifugal dryer, to disperse said slimes and maintain said bed permeability 4. The method of claim 3 wherein said nonionic surfactant dewatering aid is an alkylphenolethoxylate surfactant having from about 1 to about 10 moles of ethoxylation.

5. A treatment for fine mesh coal having a particle size less than about 10 mesh and slimes finer than $-100$ mesh, which is to be dewatered in a centrifugal dryer which treatment maintains bed permeability in centrifugal drying equipment in the presence of said slimes and lowers the ash content of the coal which comprises applying to said coal, prior to dewatering in centrifugal drying equipment from about 0.2 to about 2.5 pounds of a combination of a nonionic surfactant dewatering aid and sodium hexametaphosphate per ton of coal prior to the centrifugal dryer, to disperse said slimes and maintain said bed permeability.

6. The method of claim 5 wherein said nonionic surfactant dewatering aid is an alkylphenolethoxylate surfactant having from about 1 to about 10 moles of ethoxylation.

* * * * *